US011782276B2

(12) United States Patent
Adema et al.

(10) Patent No.: US 11,782,276 B2
(45) Date of Patent: Oct. 10, 2023

(54) SYSTEMS AND METHODS TO REDUCE BOUNCE SPACING AND DOUBLE-BOUNCE IN WAVEGUIDES

(71) Applicant: GOOGLE LLC, Mountain View, CA (US)

(72) Inventors: Daniel Adema, Kitchener (CA); Timothy Paul Bodiya, Toronto (CA); Shreyas Potnis, Kitchener (CA)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/204,451

(22) Filed: Mar. 17, 2021

(65) Prior Publication Data

US 2022/0299764 A1  Sep. 22, 2022

(51) Int. Cl.
*G02B 27/01* (2006.01)
*G02B 26/10* (2006.01)
*F21V 8/00* (2006.01)
*G03B 21/20* (2006.01)

(52) U.S. Cl.
CPC ....... *G02B 27/0172* (2013.01); *G02B 6/0023* (2013.01); *G02B 6/0068* (2013.01); *G02B 26/101* (2013.01); *G03B 21/2033* (2013.01); *G02B 2027/0118* (2013.01); *G02B 2027/0178* (2013.01)

(58) Field of Classification Search
CPC .... G02B 2027/0178; G02B 2027/0118; G02B 27/0172; G02B 2006/12107; G02B 26/101; G02B 6/0068
See application file for complete search history.

(56) References Cited

U.S. PATENT DOCUMENTS

| 6,266,359 | B1 | 7/2001 | Taheri et al. | |
|---|---|---|---|---|
| 2007/0127123 | A1 | 6/2007 | Brown et al. | |
| 2017/0120374 | A1 | 5/2017 | Hendricks et al. | |
| 2017/0365101 | A1 | 12/2017 | Samec et al. | |
| 2018/0198258 | A1* | 7/2018 | Chen | H01S 5/4025 |
| 2019/0179151 | A1* | 6/2019 | Pierer | H01S 5/4093 |
| 2019/0196201 | A1* | 6/2019 | Pierer | G02B 6/4206 |
| 2019/0196207 | A1* | 6/2019 | Pierer | G02B 6/12004 |
| 2019/0351505 | A1 | 11/2019 | O'Neill et al. | |

(Continued)

FOREIGN PATENT DOCUMENTS

| CN | 216350391 U | * | 4/2022 |
|---|---|---|---|
| CN | 216838697 U | * | 6/2022 |

(Continued)

OTHER PUBLICATIONS

International Search Report and Written Opinion dated Oct. 24, 2022 for PCT/US2022/039407, 12 pages.

*Primary Examiner* — Thomas A Hollweg
*Assistant Examiner* — Mary A El-Shammaa

(57) ABSTRACT

Systems and methods to reduce light loss from a waveguide. The system includes a waveguide having an incoupler to direct light into the waveguide and a laser projector having laser diodes mounted to a substrate. The laser projector is configured to provide a plurality of laser light beams to the incoupler of the waveguide. The system further includes at least one alignment component configured to align the plurality of laser light beams tangent with an edge of the incoupler to minimize light lost from the waveguide through contact with the incoupler more than once.

20 Claims, 12 Drawing Sheets

(56) References Cited

U.S. PATENT DOCUMENTS

| | | | |
|---|---|---|---|
| 2020/0026080 A1* | 1/2020 | Pierer | .................. H01S 5/0235 |
| 2020/0033604 A1 | 1/2020 | Schmulen et al. | |
| 2020/0225482 A1 | 7/2020 | Bodiya et al. | |
| 2021/0109353 A1 | 4/2021 | Nicholson et al. | |
| 2021/0149111 A1* | 5/2021 | Katsuyama | ............ G02B 6/125 |

FOREIGN PATENT DOCUMENTS

| | | | |
|---|---|---|---|
| WO | 2020139754 A1 | 7/2020 | |
| WO | WO-2020257505 A1 * | 12/2020 | ............... F21K 9/64 |

* cited by examiner

SYSTEMS AND METHODS TO REDUCE BOUNCE SPACING AND DOUBLE-BOUNCE IN WAVEGUIDES

BACKGROUND

In the field of optics, a combiner is an optical apparatus that combines two light sources, for example, environmental light from outside of the combiner and light transmitted from a micro-display and directed to the combiner via a waveguide. Optical combiners are used in wearable heads up displays (WHUDs), sometimes referred to as head-mounted displays (HMDs) or near-eye displays, which allow a user to view computer-generated content (e.g., text, images, or video content) superimposed over a user's environment viewed through the WHUD, creating what is known as augmented reality (AR).

Transmitting the light from a micro-display to a user's eye in a WHUD generally involves multiple reflections, refractions, diffractions, and/or changes in polarization that can result in some of the light being prematurely directed out of the waveguide or deviating from the primary path and thus, effectively being "lost" as the light does not reach the intended destination (i.e., a user's eye). This loss of light reduces the efficiency of the WHUD and can cause aberrations in the image(s) viewed by the user, such as, for example, non-uniform brightness and non-uniform color.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
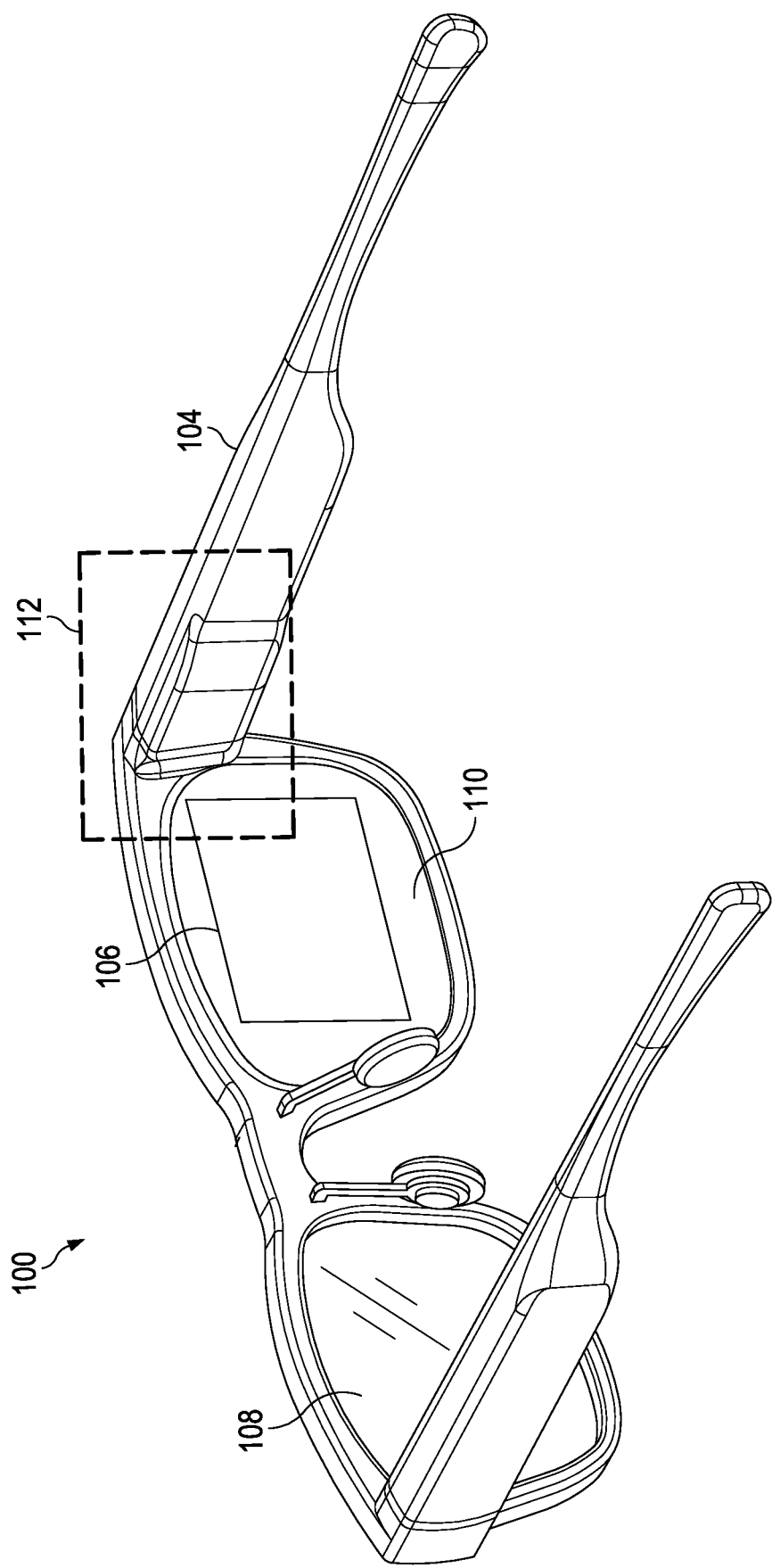
FIG. 1 shows an example display system that includes a laser projection system configured to project images toward the eye of a user, in accordance with some embodiments.

In a conventional WHUD, light, representing visual content, from a micro-display is directed into a waveguide by an incoupler, which transmits or reflects the light at a specific angle such that the light is incident on the boundaries of the waveguide at an angle of incidence greater than the critical angle for total internal reflection (TIR) of the light to occur. The light is then propagated along the inner volume of the waveguide via multiple instances of TIR until the light reaches a structure (i.e., an outcoupler) designed to direct the light out of the waveguide, usually towards a user's eye to be viewed as an image or series of images.

In some cases, the incoupler of a waveguide is implemented as a diffraction grating disposed at a surface of the waveguide, wherein the diffraction grating diffracts different wavelengths of the micro-display light at different angles. Because of these different diffraction angles, the different wavelengths of the micro-display light have different angles of propagation within the waveguide and therefore have different distances between TIR bounces within the waveguide after being transmitted or reflected by a diffraction grating incoupler. Further, the different diffraction angles of each wavelength of light can cause some light to be lost from the waveguide through a "double-bounce" effect, wherein light that is transmitted or reflected by the incoupler a first time may be incident on the incoupler a second time as a result of being reflected from a surface of the waveguide back towards the incoupler. When the light is incident on the incoupler for a second time, some of the light is transmitted or reflected out of the waveguide (i.e., "lost") and, as a consequence, less light than was originally emitted from the micro-display is transmitted through the waveguide to a user's eye resulting in reduced brightness of the image displayed to a user and a potentially diminished user experience.

The different diffraction angles of each wavelength of light can also cause different distances between bounces within the waveguide for each wavelength of light. The distance between two adjacent bounces (as measured from the center of the light beam) is known as "bounce separation" and the distance between adjacent bounces of different light beams is referred to as "bounce separation spacing". As bounce separation and bounce separation spacing between the wavelengths of light increases so does degradation of color uniformity in the image that is displayed to a user. In other words, because light having a relatively short wavelength (e.g., blue light) has a smaller diffraction angle than light of a longer wavelength (e.g., red light) the blue light will have a smaller bounce separation than the red light. That is, the blue light will experience a greater number of TIR bounces within a given area of the waveguide than the red light and, generally, the blue light will have a smaller bounce separation spacing between light beams than the red light. As a result, when the blue and red light encounter an outcoupler of the waveguide, the blue light will experience a greater number of outcoupling bounces than red light, which results in the blue light exiting the waveguide in more locations than red light. Thus, the image displayed to the viewer will have relatively consistent saturation of blue color across the image while the saturation of red color will vary in certain areas of the image.

FIGS. 1-14 illustrate embodiments of example apparatuses and techniques of the present disclosure to reduce diffraction-angle effects, such as instances of double-bounces and bounce separation spacing effects. However, it will be appreciated that the apparatuses and techniques of the present disclosure are not limited to implementation to the depicted display systems, but instead may be implemented in any of a variety of display systems using the guidelines provided herein. In some embodiments of the example apparatuses, a micro-display associated with a waveguide employs laser diodes configured to produce light beams of different wavelengths, wherein each light beam has a circumference that is proportional to the expected diffraction angle to be imparted on the particular light beam when incident on an incoupler of the waveguide. For example, increasing the beam circumference for longer wavelengths of light (i.e., red light) relative to shorter wavelengths of light (i.e. blue light) reduces the bounce separation spacing between beams and reduces color degradation in the image output from display system. Further, in some embodiments, the laser diodes are positioned such that the emitted light beams are oriented so as to be biased at an edge of the incoupler. Thus, the example apparatuses and techniques reduce instances of double-bounces and bounce separation spacing of the light beams as they are transmitted within the waveguide.

FIG. 1 illustrates an example display system 100 having a support structure 102 that includes an arm 104, which houses a laser projection system configured to project images toward the eye of a user, such that the user perceives the projected images as being displayed in a field of view (FOV) area 106 of a display at one or both of lens elements 108, 110. In the depicted embodiment, the display system 100 is a wearable heads-up display (WHUD) that includes a support structure 102 configured to be worn on the head of a user and has a general shape and appearance of an eyeglasses (e.g., sunglasses) frame. The support structure 102 contains or otherwise includes various components to facilitate the projection of such images toward the eye of the user, such as a laser projector, an optical scanner, and a waveguide. In some embodiments, the support structure 102 further includes various sensors, such as one or more front-facing cameras, rear-facing cameras, other light sensors, motion sensors, accelerometers, and the like. The support structure 102 further can include one or more radio frequency (RF) interfaces or other wireless interfaces, such as a Bluetooth™ interface, a WiFi interface, and the like. Further, in some embodiments the support structure 102 further includes one or more batteries or other portable power sources for supplying power to the electrical components of the display system 100. In some embodiments, some or all of these components of the display system 100 are fully or partially contained within an inner volume of support structure 102, such as within the arm 104 in region 112 of the support structure 102. It should be noted that while an example form factor is depicted, it will be appreciated that the display system 100 may have a different shape and appearance from the eyeglasses frame depicted in FIG. 1.

One or both of the lens elements 108, 110 are used by the display system 100 to provide an augmented reality (AR) display in which rendered graphical content can be superimposed over or otherwise provided in conjunction with a real-world view as perceived by the user through the lens elements 108, 110. For example, laser light used to form a perceptible image or series of images may be projected by a laser projector of the display system 100 onto the eye of the user via a series of optical elements, such as a waveguide formed at least partially in the corresponding lens element, one or more scan mirrors, and one or more optical relays. One or both of the lens elements 108, 110 thus include at least a portion of a waveguide that routes display light received by an incoupler of the waveguide to an outcoupler of the waveguide, which outputs the display light toward an eye of a user of the display system 100. The display light is modulated and scanned onto the eye of the user such that the user perceives the display light as an image. In addition, each of the lens elements 108, 110 is sufficiently transparent to allow a user to see through to provide a field of view of the user's real-world environment such that the image appears superimposed over at least a portion of the real-world environment.

In some embodiments, the projector is a digital light processing-based projector, a scanning laser projector, or any combination of a modulative light source such as a laser or one or more LEDs and a dynamic reflector mechanism such as one or more dynamic scanners or digital light processors. In some embodiments, the projector includes multiple laser diodes (e.g., a red laser diode, a green laser diode, and/or a blue laser diode) and at least one scan mirror (e.g., two one-dimensional scan mirrors, which may be micro-electromechanical system (MEMS)-based or piezo-based). The projector is communicatively coupled to the controller and a non-transitory processor-readable storage medium or memory storing processor-executable instructions and other data that, when executed by the controller, cause the controller to control the operation of the projector. In some embodiments, the controller controls a scan area size and scan area location for the projector and is communicatively coupled to a processor (not shown) that generates content to be displayed at the display system 100.

The projector scans light over a variable area, designated the FOV area 106, of the display system 100. The scan area size corresponds to the size of the FOV area 106 and the scan area location corresponds to a region of one of the lens elements 108, 110 at which the FOV area 106 is visible to the user. In some embodiments, the projector routes light via first and second scan mirrors, an optical relay disposed between the first and second scan mirrors, and a waveguide disposed at the output of the second scan mirror. In some embodiments, at least a portion of an outcoupler of the waveguide may overlap the FOV area 106.

In order to reduce instances of double-bounces and bounce separation spacing of the light beams as they are transmitted within the waveguide, in some embodiments, the laser diodes of the projector are each configured to produce a laser light beam having a unique circumference relative to the other laser light beams produced by the other laser diodes. Further, in some embodiments, the laser diodes are oriented within the projector to align each of the laser light beams with an edge of the incoupler of the waveguide. Examples of these aspects are described in greater detail below.

Figure 2:
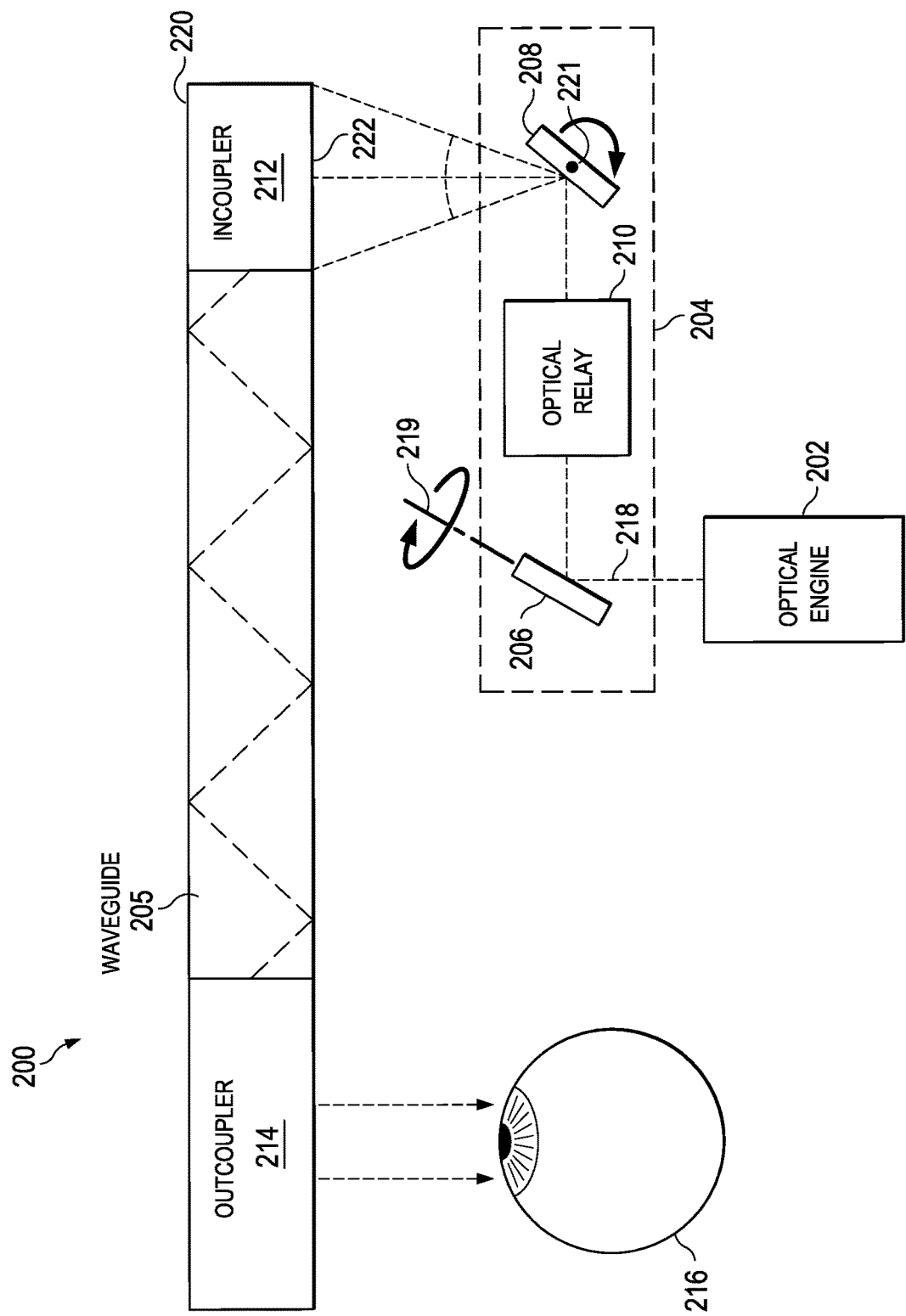
FIG. 2 shows a simplified block diagram of the laser projection system of FIG. 1, in accordance with some embodiments.

FIG. 2 illustrates a simplified block diagram of a laser projection system 200 that projects images directly onto the eye of a user via laser light. The laser projection system 200 includes an optical engine 202, an optical scanner 204, and a waveguide 205. The optical scanner 204 includes a first scan mirror 206, a second scan mirror 208, and an optical relay 210. The waveguide 205 includes an incoupler 212 and an outcoupler 214, with the outcoupler 214 being optically aligned with an eye 216 of a user in the present example. The incoupler 212 of the waveguide 205 includes at least a first edge 220 and a second edge 222. In some embodiments, the laser projection system 200 is implemented in a wearable heads-up display or other display system, such as the display system 100 of FIG. 1.

The optical engine 202 includes one or more laser light sources configured to generate and output laser light 218 (e.g., visible laser light such as red, blue, and green laser light and/or non-visible laser light such as infrared laser light). In some embodiments, the optical engine 202 is coupled to a driver or other controller (not shown), which controls the timing of emission of laser light from the laser light sources of the optical engine 202 in accordance with instructions received by the controller or driver from a computer processor coupled thereto to modulate the laser light 218 to be perceived as images when output to the retina of an eye 216 of a user.

For example, during operation of the laser projection system 200, multiple laser light beams having respectively different wavelengths are output by the laser light sources of the optical engine 202, then combined via a beam combiner (not shown), before being directed to the eye 216 of the user. The optical engine 202 modulates the respective intensities of the laser light beams so that the combined laser light reflects a series of pixels of an image, with the particular intensity of each laser light beam at any given point in time contributing to the amount of corresponding color content and brightness in the pixel being represented by the combined laser light at that time.

One or both of the scan mirrors 206 and 208 of the optical scanner 204 are MEMS mirrors in some embodiments. For example, the scan mirror 206 and the scan mirror 208 are MEMS mirrors that are driven by respective actuation voltages to oscillate during active operation of the laser projection system 200, causing the scan mirrors 206 and 208 to scan the laser light 218. Oscillation of the scan mirror 206 causes laser light 218 output by the optical engine 202 to be scanned through the optical relay 210 and across a surface of the second scan mirror 208. The second scan mirror 208 scans the laser light 218 received from the scan mirror 206 toward an incoupler 212 of the waveguide 205. In some embodiments, the scan mirror 206 oscillates along a first scanning axis 219, such that the laser light 218 is scanned in only one dimension (i.e., in a line) across the surface of the second scan mirror 208. In some embodiments, the scan mirror 208 oscillates or otherwise rotates along a second scanning axis 221 that is perpendicular to the first scanning axis.

In some embodiments, the incoupler 212 has a substantially rectangular profile and is configured to receive the laser light 218 and direct the laser light 218 into the waveguide 205. The incoupler 212 is defined by a smaller dimension (i.e., width) and a larger orthogonal dimension (i.e., length). In some embodiments, the incoupler 212 has a substantially circular or square shape. In an embodiment, the optical relay 210 is a line-scan optical relay that receives the laser light 218 scanned in a first dimension by the first scan mirror (e.g., the first dimension corresponding to the small dimension of the incoupler 212), routes the laser light 218 to the second scan mirror 208, and introduces a convergence to the laser light 218 in the first dimension to an exit pupil beyond the second scan mirror 208. According to various embodiments, the optical relay 210 includes one or more collimation lenses that shape and focus the laser light 218 on the second scan mirror 208 or includes a molded reflective relay that includes two or more spherical, aspheric, parabolic, and/or freeform lenses that shape and direct the laser light 218 onto the second scan mirror 208. The second scan mirror 208 receives the laser light 218 and scans the laser light 218 in a second dimension, the second dimension corresponding to the long dimension of the incoupler 212 of the waveguide 205. In some embodiments, the second scan mirror 208 causes the exit pupil of the laser light 218 to be swept along a line along the second dimension. In some embodiments, the incoupler 212 is positioned at or near the swept line downstream from the second scan mirror 208 such that the second scan mirror 208 scans the laser light 218 as a line or row over the incoupler 212.

In some embodiments, the optical engine 202 includes at least one edge-emitting laser (EEL) diode that emits a laser light beam 218 having a substantially elliptical, non-circular cross-section, and the optical relay 210 magnifies or minimizes the laser light beam 218 along its semi-major or semi-minor axis to circularize the laser light beam 218 prior to convergence of the laser light beam 218 on the second scan mirror 208. In some embodiments, each EEL diode is configured to provide a laser light beam of a particular wavelength such that the circumference of each laser light beam is different relative to the laser light beams emitted by the other EELs in order to reduce bounce separation spacing. That is, each wavelength of light is emitted by an EEL diode such that its circumference is different from the circumference of the other wavelengths of light being emitted by the other EELs in the optical engine 202. As light of shorter wavelengths (e.g., blue light of approximately 450 nm) has a smaller diffraction angle relative to light of longer wavelengths (e.g., red light of approximately 638 nm), an increased beam size for red light will minimize the amount of bounce separation spacing (that is, the distance between a given bounce and the next-closest bounce of light having the same wavelength) in the waveguide 205, thus minimizing degradation of color uniformity in the image represented by the laser light as it traverses the waveguide. In some embodiments, at least one EEL diode is configured to provide a laser light beam of a particular wavelength such that the circumference of the beam is different from laser light beams emitted from the other EELs. In some such embodiments, a surface of a mirror plate of the scan mirror 206 is elliptical and non-circular (e.g., similar in shape and size to the cross-sectional area of the laser light 218). In other such embodiments, the surface of the mirror plate of the scan mirror 206 is circular.

The waveguide 205 of the laser projection system 200 includes the incoupler 212 and the outcoupler 214. The term "waveguide," as used herein, will be understood to mean a combiner using one or more of total internal reflection (TIR), specialized filters, and/or reflective surfaces, to transfer light from an incoupler (such as the incoupler 212) to an outcoupler (such as the outcoupler 214). In some display applications, the light is a collimated image, and the waveguide transfers and replicates the collimated image to the eye. In general, the terms "incoupler" and "outcoupler" will be understood to refer to any type of optical grating structure, including, but not limited to, diffraction gratings, holograms, holographic optical elements (e.g., optical elements using one or more holograms), volume diffraction gratings, volume holograms, surface relief diffraction gratings, and/or surface relief holograms. In some embodiments, a given incoupler or outcoupler is configured as a transmissive grating (e.g., a transmissive diffraction grating or a transmissive holographic grating) that causes the incoupler or outcoupler to transmit light and to apply designed optical function(s) to the light during the transmission. In some embodiments, a given incoupler or outcoupler is a reflective grating (e.g., a reflective diffraction grating or a reflective holographic grating) that causes the incoupler or outcoupler to reflect light and to apply designed optical function(s) to the light during the reflection. In the present example, the laser light 218 received at the incoupler 212 is relayed to the outcoupler 214 via the waveguide 205 using TIR. The laser light 218 is then output to the eye 216 of a user via the outcoupler 214. As described above, in some embodiments the waveguide 205 is implemented as part of an eyeglass lens, such as the lens 108 or lens 110 (FIG. 1) of the display system having an eyeglass form factor and employing the laser projection system 200.

Although not shown in the example of FIG. 2, in some embodiments additional optical components are included in any of the optical paths between the optical engine 202 and the scan mirror 206, between the scan mirror 206 and the optical relay 210, between the optical relay 210 and the scan mirror 208, between the scan mirror 208 and the incoupler 212, between the incoupler 212 and the outcoupler 214, and/or between the outcoupler 214 and the eye 216 (e.g., in order to shape the laser light for viewing by the eye 216 of the user). In some embodiments, a prism is used to steer light from the scan mirror 208 into the incoupler 212 so that light is coupled into incoupler 212 at the appropriate angle to encourage propagation of the light in waveguide 205 by TIR. Also, in some embodiments, an exit pupil expander (e.g., an exit pupil expander 304 of FIG. 3, described below), such as a fold grating, is arranged in an intermediate stage between incoupler 212 and outcoupler 214 to receive light that is coupled into waveguide 205 by the incoupler 212, expand the light, and redirect the light towards the outcoupler 214, where the outcoupler 214 then couples the laser light out of waveguide 205 (e.g., toward the eye 216 of the user).

Figure 3:
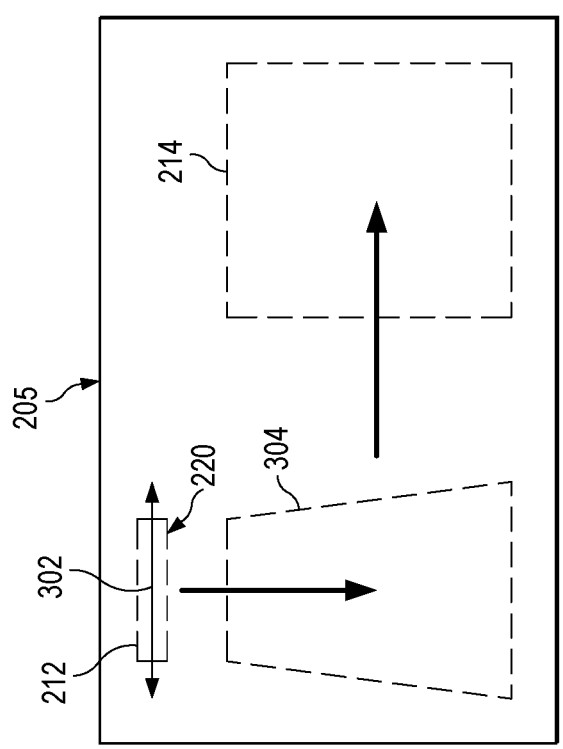
FIG. 3 shows an example of light propagation within the waveguide of the laser projection system of FIG. 2 in accordance with some embodiments.

FIG. 3 shows an example of light propagation within the waveguide 205 of the laser projection system 200 of FIG. 2 in accordance with some embodiments. As shown, light is received via the incoupler 212, having a first edge 306, and scanned along the axis 302 which is parallel to the first edge 306. The light is then directed into an exit pupil expander 304 and is then routed to the outcoupler 214 to be output (e.g., toward the eye of the user). In some embodiments, the exit pupil expander 304 expands one or more dimensions of the eyebox of a WHUD that includes the laser projection system 200 (e.g., with respect to what the dimensions of the eyebox of the WHUD would be without the exit pupil expander 304). In some embodiments, the incoupler 212 and the exit pupil expander 304 each include respective one-dimensional diffraction gratings (i.e., diffraction gratings that extend along one dimension). It should be understood that FIG. 3 shows a substantially ideal case in which the incoupler 212 directs light straight down (with respect to the presently illustrated view) in a first direction that is perpendicular to the scanning axis 302, and the exit pupil expander 304 directs light to the right (with respect to the presently illustrated view) in a second direction that is perpendicular to the first direction. While not shown in the present example, it should be understood that, in some embodiments, the first direction in which the incoupler 212 directs light is slightly or substantially diagonal, rather than exactly perpendicular, with respect to the scanning axis 302.

Figure 4:
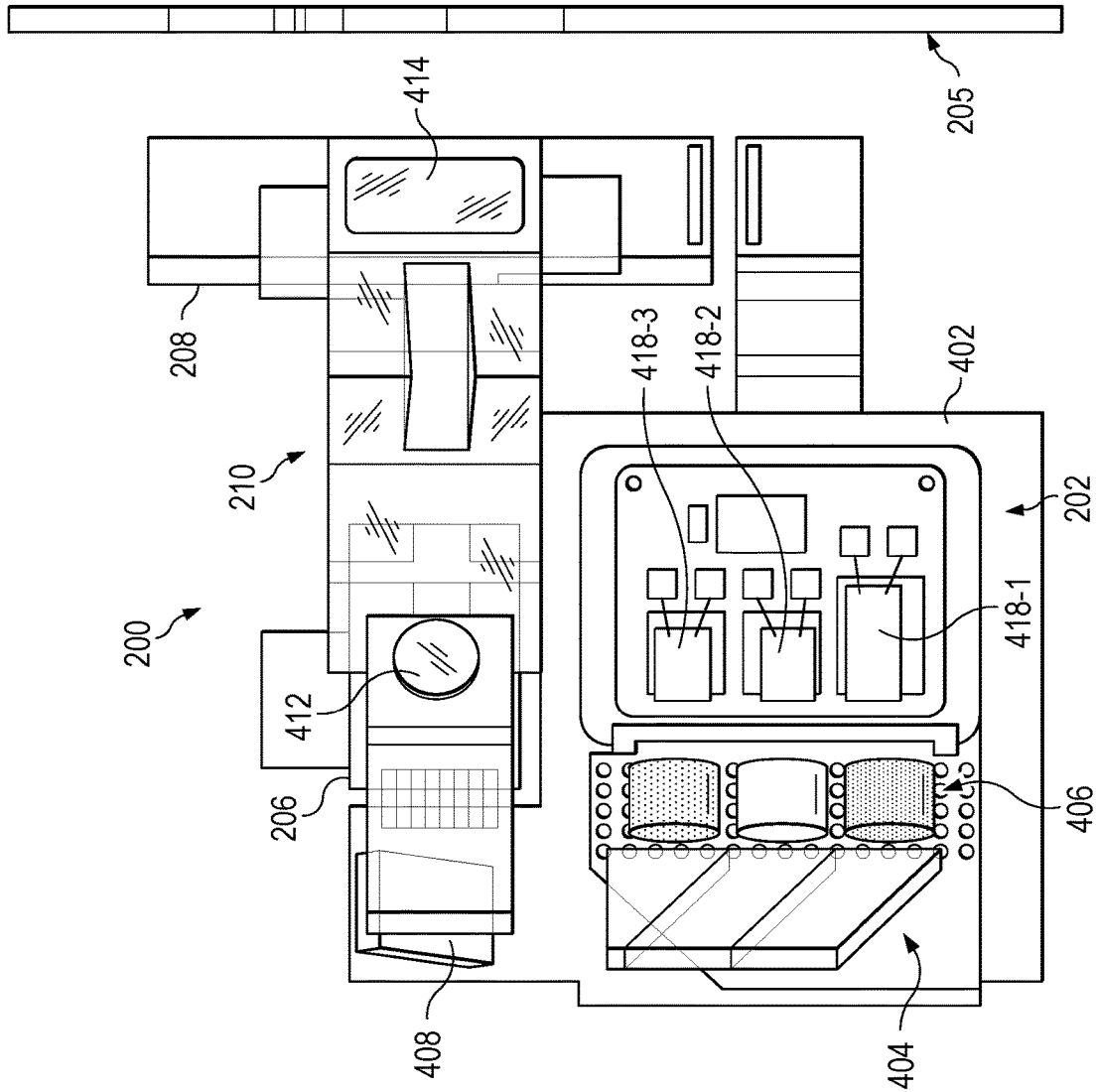
FIG. 4 shows an example embodiment of the laser projection system of FIG. 2 in which the optical relay includes a molded reflective relay, in accordance with some embodiments.

FIG. 4 shows an example embodiment of the laser projection system 200 in which the optical relay 210 includes a molded reflective relay. As shown, the laser projection system 200 includes a substrate 402 on which a beam combiner 404, primary lenses 406, and a mirror 408 are disposed. According to various embodiments, the substrate 402 is a printed circuit board (PCB) or otherwise another applicable substrate.

The optical engine 202 is composed of a set of one or more laser light sources 418 (e.g., laser diodes), such as the illustrated red laser light source 418-1, green laser light source 418-2, and blue laser light source 418-3, wherein a processor or other controller operates the optical engine 202 to modulate the respective intensity of each laser light source 418 so as to provide a corresponding red light, green light, and blue light contribution to a corresponding pixel of an image being generated for display to the user. The primary lenses 406 includes a corresponding number of collimation lenses (e.g., three for the three laser light sources 418 in the example above), each interposed in the light path between a respective laser light source 418 of the optical engine 202 and the beam combiner 404. For example, each laser light source 418 outputs a different wavelength of laser light (e.g., corresponding to respective red, blue, and green wavelengths) through the primary lenses 406 to be combined at the beam combiner 404 to produce the laser light (i.e., laser light 218 shown in FIG. 2) to be projected by the laser projection system 200. The beam combiner 404 receives the individual laser light inputs and outputs a combined laser light 218 to the mirror 408, which redirects the laser light 218 onto a reflective surface 412 of the scan mirror 206. The scan mirror 206 scans the laser light 218 into the optical relay 210 across a first scanning axis.

The optical relay 210 is configured to route the laser light 218 toward a reflective surface 414 of the scan mirror 208. The scan mirror 208 scans the laser light 218 across the incoupler (such as the incoupler 212) of the waveguide 205 along a second scanning axis that is perpendicular to the first scanning axis.

Figure 5:
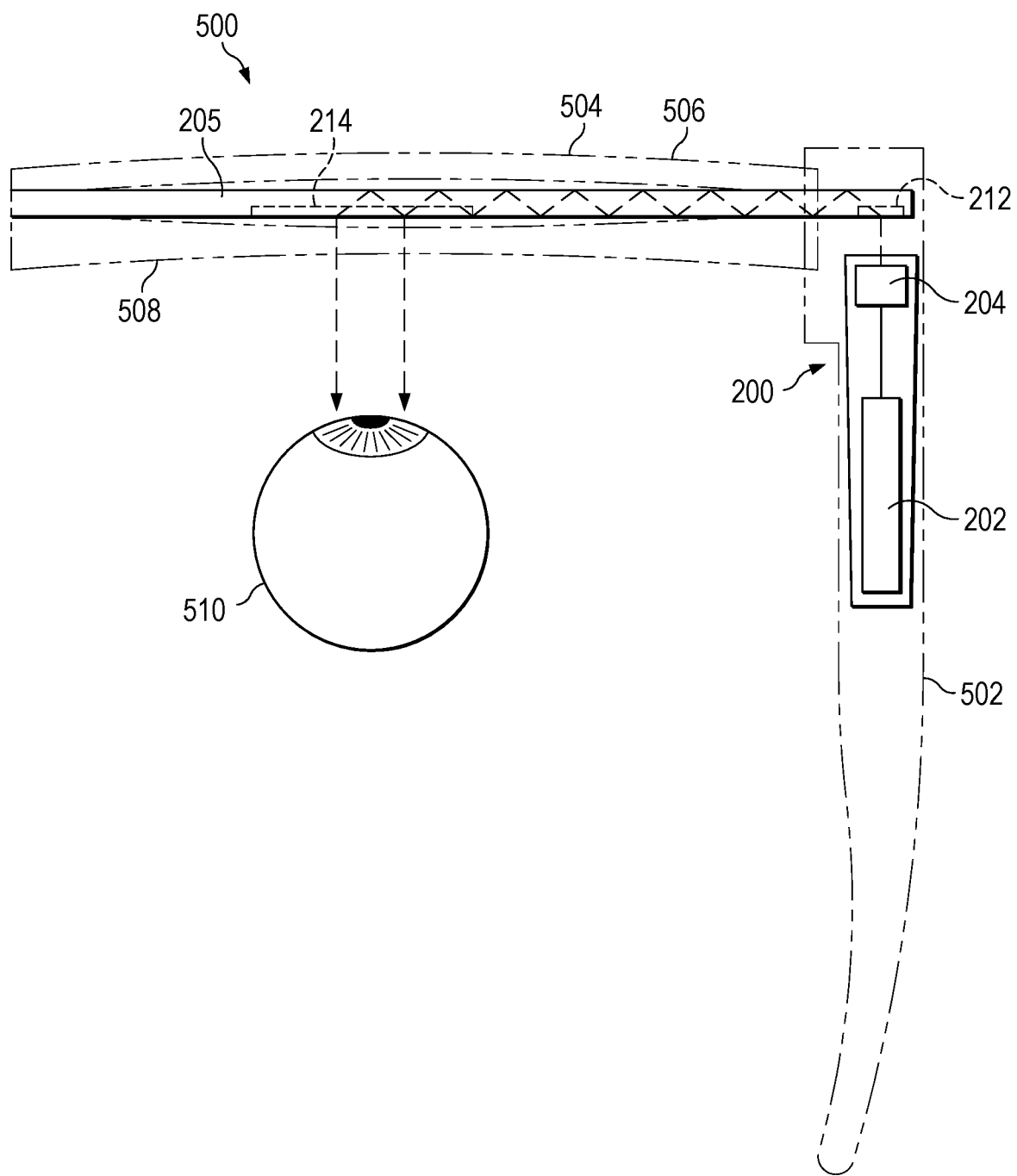
FIG. 5 shows a portion of a wearable heads-up display (WHUD) that includes the laser projection system of FIG. 2, in accordance with some embodiments.

FIG. 5 illustrates a portion of a WHUD 500 that includes the laser projection system 200 of FIG. 2. In some embodiments, the WHUD 500 represents the display system 100 of FIG. 1. The optical engine 202, the optical scanner 204, the incoupler 212, and a portion of the waveguide 205 are included in an arm 502 of the WHUD 600, in the present example.

The WHUD 500 includes an optical combiner lens 504, which includes a first lens 506, a second lens 508, and the waveguide 205, with the waveguide 205 disposed between the first lens 506 and the second lens 508. Light exiting through the outcoupler 214 travels through the second lens 508 (which corresponds to, for example, the lens element 110 of the display system 100). In use, the light exiting second lens 508 enters the pupil of an eye 510 of a user wearing the WHUD 500, causing the user to perceive a displayed image carried by the laser light output by the optical engine 202. The optical combiner lens 504 is substantially transparent, such that light from real-world scenes corresponding to the environment around the WHUD 500 passes through the first lens 506, the second lens 508, and the waveguide 205 to the eye 510 of the user. In this way, images or other graphical content output by the laser projection system 200 are combined (e.g., overlayed) with real-world images of the user's environment when projected onto the eye 510 of the user to provide an AR experience to the user.

Although not shown in the depicted example, in some embodiments additional optical elements are included in any of the optical paths between the optical engine 202 and the incoupler 212, in between the incoupler 212 and the outcoupler 214, and/or in between the outcoupler 214 and the eye 510 of the user (e.g., in order to shape the laser light for viewing by the eye 510 of the user). As an example, a prism is used to steer light from the optical scanner 204 into the incoupler 212 so that light is coupled into incoupler 212 at the appropriate angle to encourage propagation of the light in waveguide 205 by TIR. Also, in some embodiments, an exit pupil expander (e.g., the exit pupil expander 304), such as a fold grating, is arranged in an intermediate stage between incoupler 212 and outcoupler 214 to receive light that is coupled into waveguide 205 by the incoupler 212, expand the light, and redirect the light towards the outcoupler 214, where the outcoupler 214 then couples the laser light out of waveguide 205 (e.g., toward the eye 510 of the user).

Figure 6:
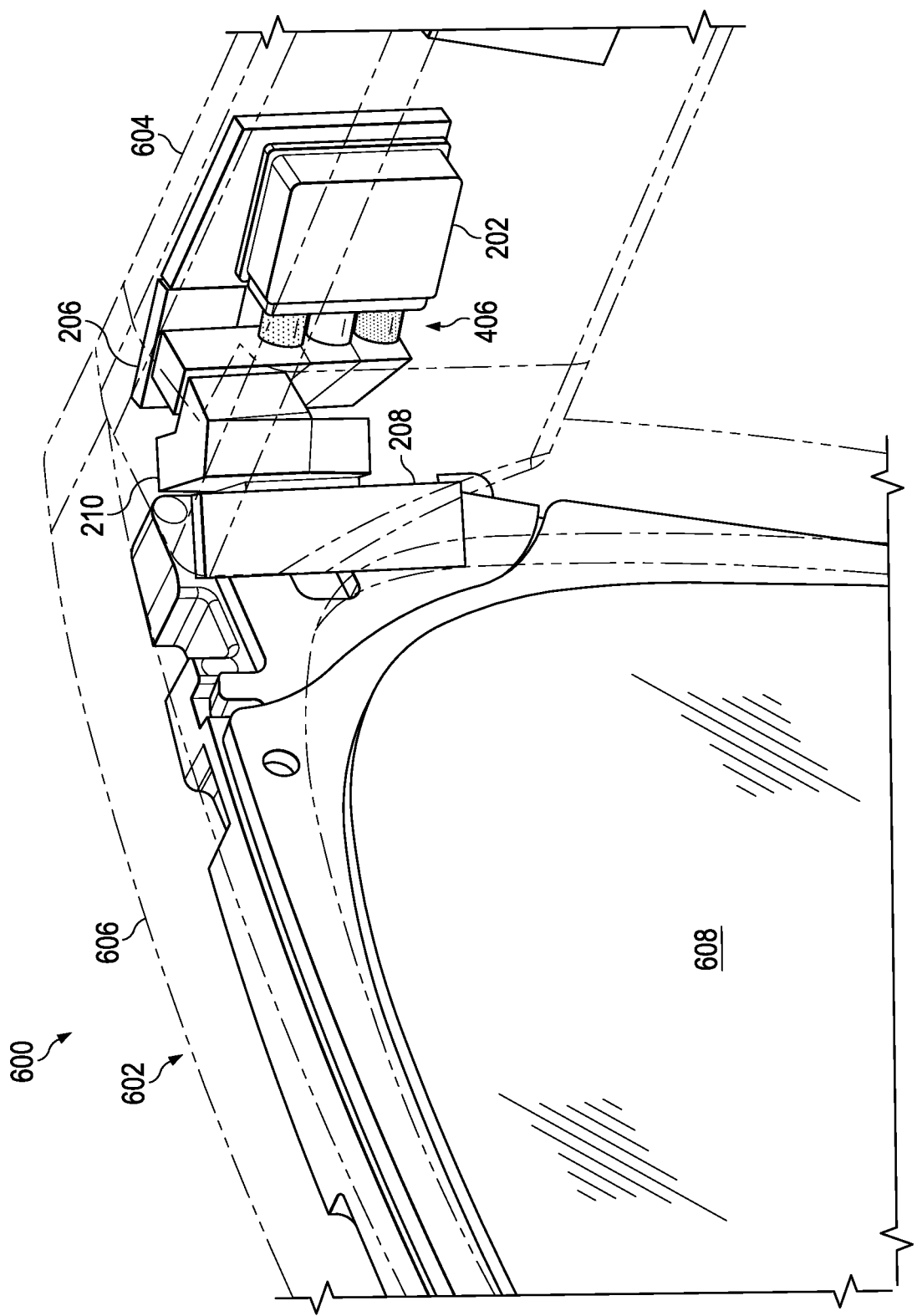
FIG. 6 shows a perspective, partially transparent view of a portion of a WHUD, such as the WHUD of FIG. 6 or the display system of FIG. 1, in accordance with some embodiments.

FIG. 6 shows a perspective, partially transparent view of a portion of a WHUD 600, which represents the WHUD 500 of FIG. 5 or the display system 100 of FIG. 1. The WHUD 600 includes an example arrangement of the laser projection system 200 of FIGS. 2, 4, and 5 for an embodiment in which the optical relay 210 is a molded reflective relay. In some embodiments, the WHUD 600 corresponds to the display system 100 of FIG. 1, and the illustrated portion of the WHUD 600 corresponds to region 112 of the display system 100.

The arm 604 of the WHUD 600 houses the optical engine 202, the primary lenses 406 and at least a portion of the first scan mirror 206. A frame section 606 of the WHUD 600 houses the second scan mirror 208, portions of the first scan mirror 206, and the optical relay 210. The incoupler 212 and the outcoupler 214 of the waveguide 205, are each embedded in or otherwise disposed on the lens 608 (one embodiment of, for example, lens 110 of FIG. 1). As described previously, laser light output by the optical engine 202 (e.g., laser light 218, FIG. 5) is routed to the incoupler 212 via at least the first scan mirror 206, the optical relay 210, and the second scan mirror 208. The first scan mirror 206 oscillates or otherwise rotates to scan the laser light along a first scanning axis, and the second scan mirror 208 oscillates or otherwise rotates to scan the laser light along a second scanning axis that is perpendicular to the first scanning axis. Laser light reflected by the second scan mirror 208 converges to a line at the incoupler 212. Laser light received at the incoupler 212 is routed to the outcoupler 214 via the waveguide 205. The light received at the outcoupler 214 is then directed out of the waveguide 205 (e.g., toward the eye of a user of the WHUD 600).

To reduce degradation of color uniformity of the light directed out of the waveguide, it is desirable to minimize instances of double-bounces and reduce bounce separation spacing. Accordingly, a system, such as the WHUD of FIG. 5 or FIG. 6, can include a laser light projector configured to provide laser light beams of different wavelengths at different beam sizes to reduce bounce separation spacing. Further, to reduce the possibility that light will encounter the incoupler more than once, each beam of light can be directed towards an edge of the incoupler, for example, the first or second edge 220, 222 shown in FIG. 2, that lies in the direction of light propagation within the waveguide. By aligning the light beams with the edge of the incoupler, the light beams are directed into the waveguide by the incoupler and then along a path directed away from the incoupler in order to reduce the possibility that the light beams will encounter the incoupler more than once. In some embodiments, the system includes at least one alignment component configured to align each laser light beam emitted by the laser light projector such that the beams are tangent with an edge of the incoupler in order to minimize double-bounces by laser light beams entering the waveguide via an incoupler.

Figure 7:
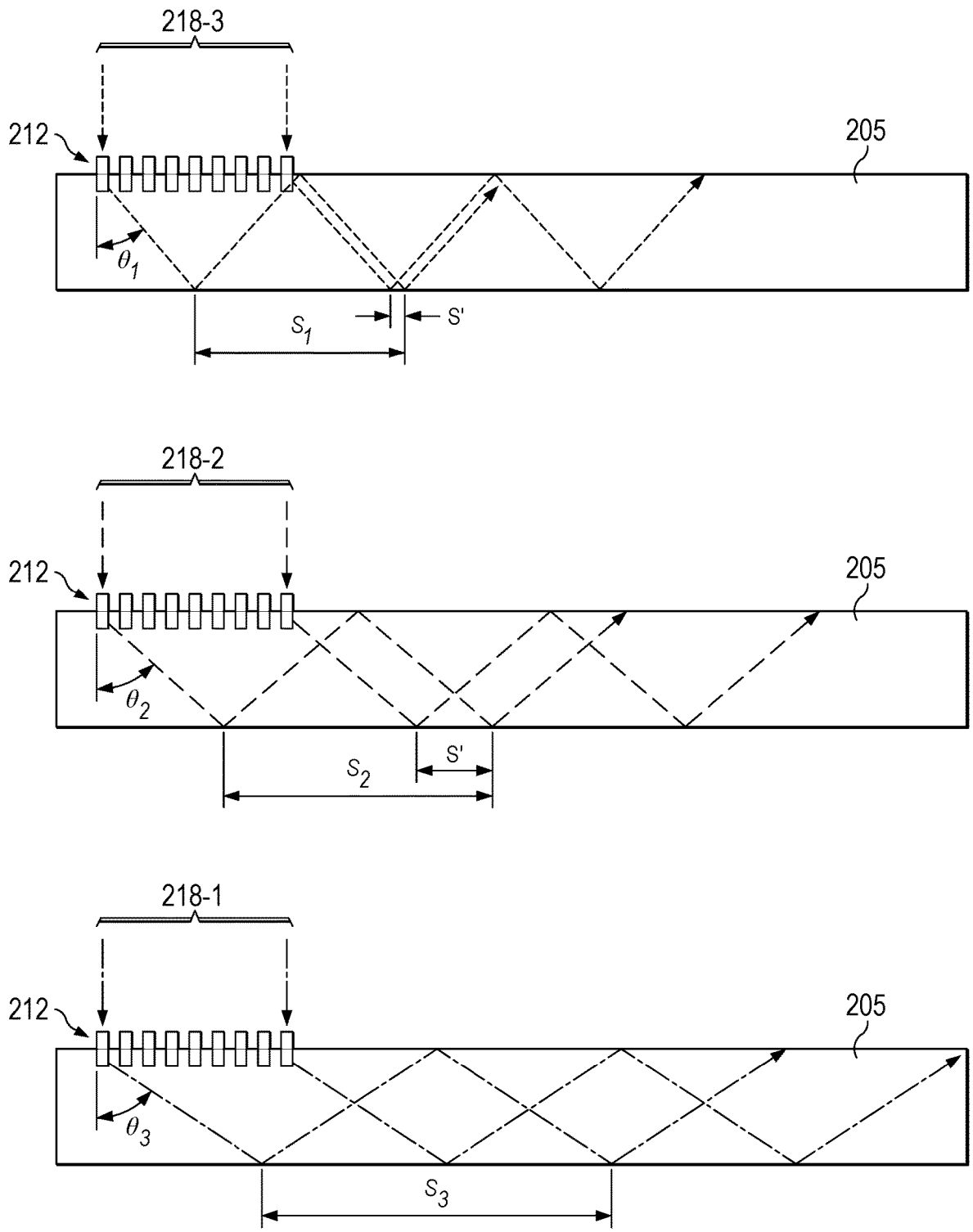
FIG. 7 shows the bounce separation for different wavelengths of laser light when incident on an incoupler of a waveguide, such as the incoupler of the waveguide of FIG. 2, in accordance with some embodiments.
Figure 8:
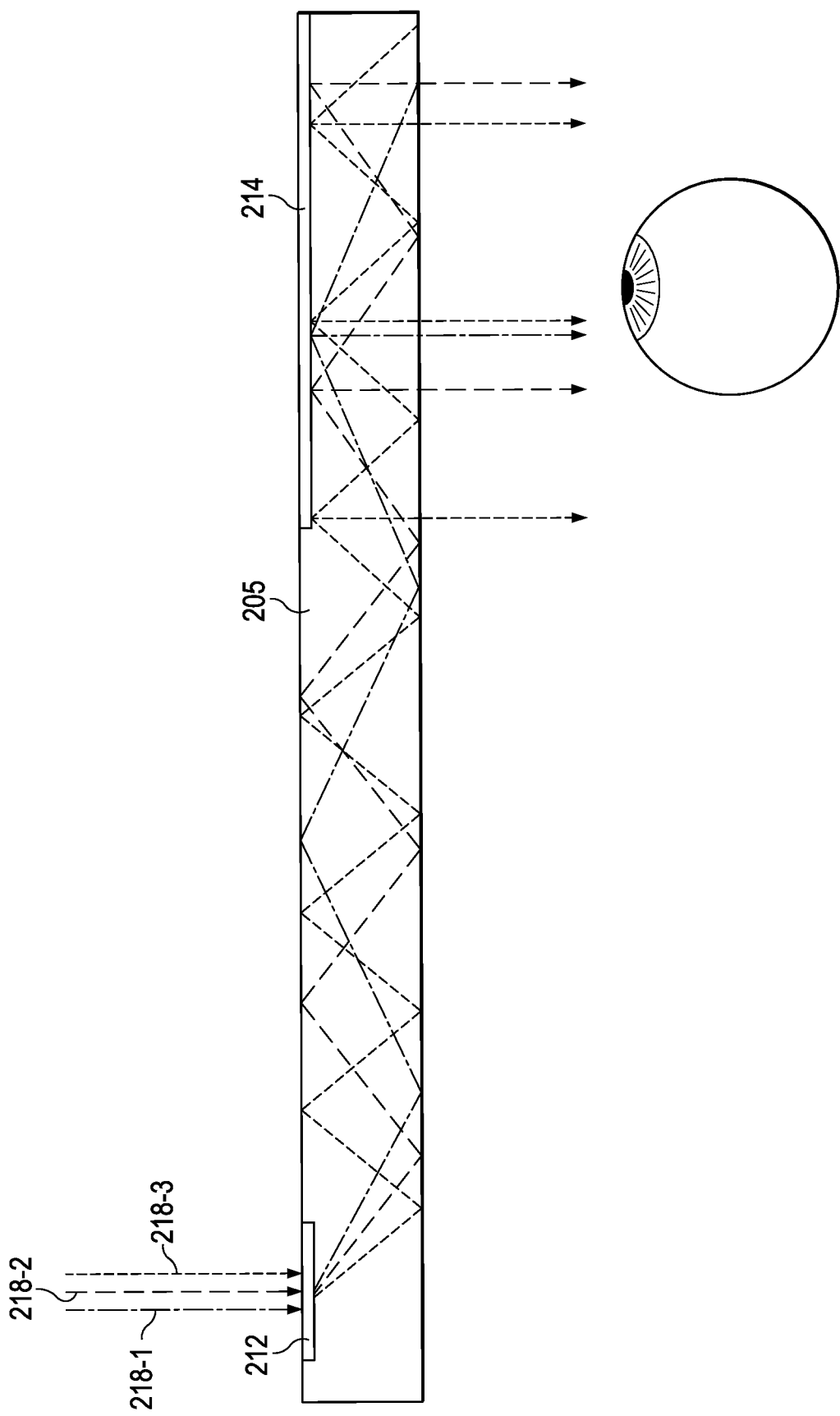
FIG. 8 shows total internal reflection bounces of light having different wavelengths within a waveguide, such as the waveguide of FIG. 2, in accordance with some embodiments.

FIG. 7 illustrates the bounce separation and bounce separation spacing for different wavelengths of laser light 218 when incident on a diffractive grating incoupler of a waveguide, such as incoupler 212 and waveguide 205 of FIG. 2. For example, a laser beam composed primarily of blue light 218-3 will be diffracted by the incoupler 212 at angle $\theta_1$, light composed primarily of green light 218-2 is diffracted at angle $\theta_2$, and light composed primarily of red light 218-1 is diffracted at angle $\theta_3$, such that $\theta_3 > \theta_2 > \theta_1$. The distance between the nearest bounces on the same surface of the waveguide 205 defines the bounce separation for each color of light. For example, in the illustrated embodiment, a guided beam of blue light 218-3 has a bounce separation of $S_1$, a guided beam of green light 218-2 has a bounce separation of $S_2$, and a guided beam of red light 218-1 has a bounce separation of $S_3$. The bounce separation spacing is represented by S'. Thus, the guided blue laser beam 218-3 experiences more TIR bounces within the waveguide before reaching an outcoupler 214 than will the guided red laser beam 218-1, as illustrated in FIG. 8. Likewise, the guided blue laser beam 218-2 experiences more outcoupling bounces from the outcoupler 214, as also illustrated in FIG. 8.

Figure 9:
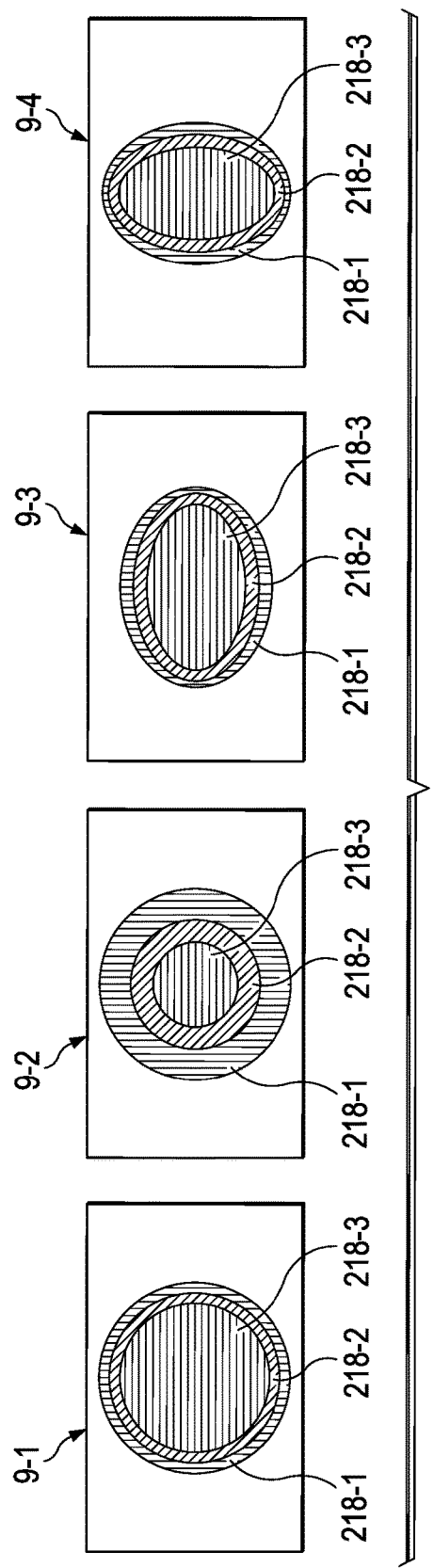
FIG. 9 shows example cross-sections of concentric combined laser light beams to be provided from an optical engine to a waveguide, such as the optical engine and waveguide of FIG. 2.

FIG. 9 illustrates example cross-sections of combined laser light beams to be provided from an optical engine to a waveguide, such as the optical engine 202 and waveguide 205 of FIG. 2. The different laser beam sizes aid in minimizing bounce separation spacing of the different color laser beams so as to prevent degradation of color uniformity in an image presented to a viewer. Cross-sections 9-1 and 9-2 illustrates circular, concentric laser light beams 218 composed of red laser light 218-1, green laser light 218-2, and blue laser light 218-3 beams having different circumferences. Cross-sections 9-3 and 9-4 illustrate concentric laser light beams 218 composed of red laser light 218-1, green laser light 218-2, and blue laser light 218-3 beams having differing major and minor axes lengths.

Figure 10:
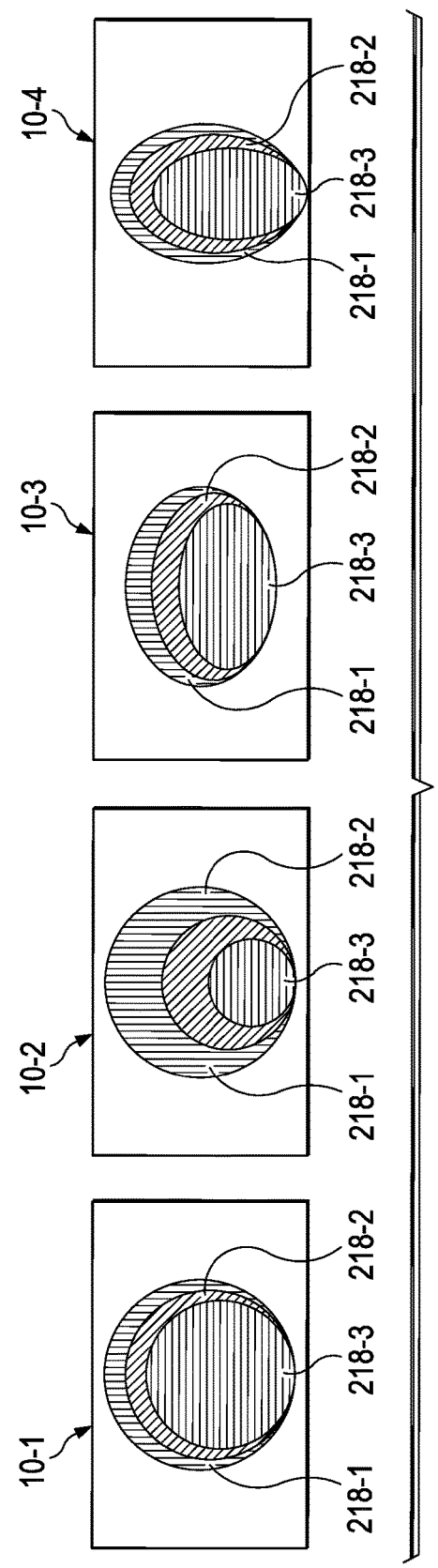
FIG. 10 shows example cross-sections of non-concentric combined laser light beams to be provided from an optical engine to a waveguide, such as the optical engine and waveguide of FIG. 2.

While the laser light beams are depicted as concentric in FIG. 9, in some embodiments, the beams are non-concentric and biased to be tangent to an edge of the incoupler 212, as illustrated in FIG. 10. Aligning the beams to be tangent to an edge of the incoupler 212, such as edge 306 of FIG. 3, reduces the possibility of the light beams encountering the incoupler for a second time after being directed into the waveguide. Cross-sections 10-1 and 10-2 illustrate circular, non-concentric laser light beams 218 composed of red laser light 218-1, green laser light 218-2, and blue laser light 218-3 beams having different circumferences. Cross-sections 10-3 and 10-4 illustrate non-concentric laser light beams 218 composed of red laser light 218-1, green laser light 218-2, and blue laser light 218-3 beams having differing major and minor axes lengths. In some embodiments, biasing each of the laser light beams to be tangent to an edge of the incoupler 212 is achieved by employing at least one alignment component configured to adjust the positioning of the laser light beams such that at least a vertex of each of the laser light beams lies on a common tangent, as further described below.

Figure 11:
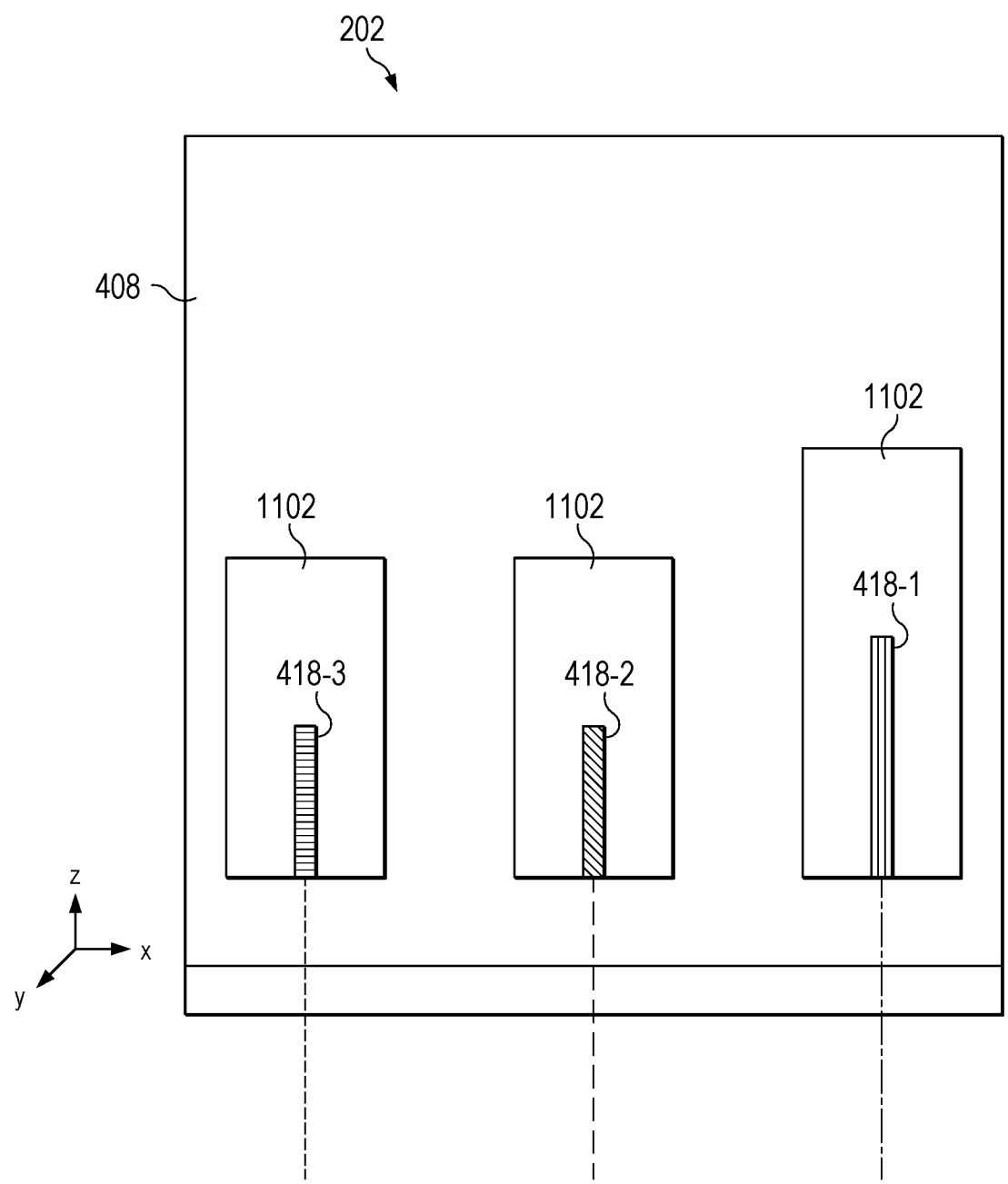
FIG. 11 shows a top view of a block diagram of a portion of an optical engine, such as the optical engine of FIG. 4, employing alignment components to mount each laser light source at a unique height from the substrate of the optical engine, in accordance with some embodiments.

FIG. 11 illustrates a top view of a block diagram of a portion of an optical engine, such as optical engine 202 of FIG. 4, employing alignment components 1102 to mount each laser light source 418-1, 418-2, 418-3 at a unique height from the substrate 402 of the optical engine 202. By mounting the laser light sources 418 of the optical engine 202 at different heights, the laser beams emitted by the laser light sources 418 can be aligned to be non-concentric, such as illustrated in FIG. 10. In some embodiments, the alignment components 1102 are submounts configured to mount each of the laser light sources 418 a specific height from the substrate 402 of the optical engine 202. The height of each submount is based on the size of the laser beam to be emitted from the laser light source 418 mounted thereto.

Figure 12:
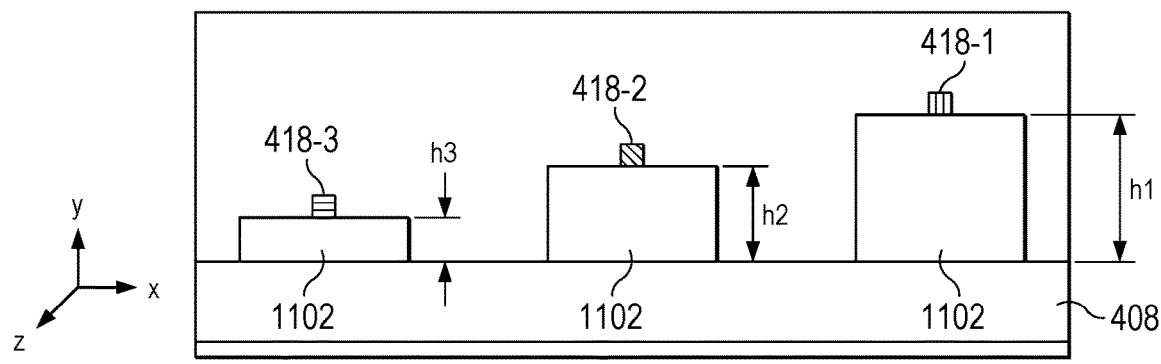
FIG. 12 shows a front view of the block diagram of FIG. 11 showing a portion of the optical engine, in accordance with some embodiments.
Figure 13:
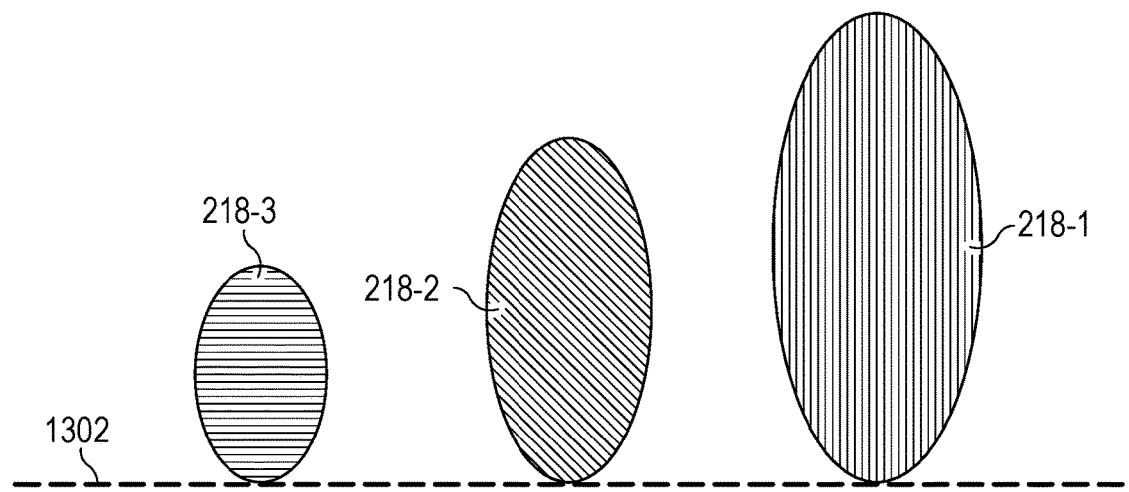
FIG. 13 shows cross-sections of laser light beams of different wavelengths, such as the laser light beams emitted by the optical engine of FIGS. 11 and 12, each having a vertex aligned with a tangent.

FIG. 12 illustrates a front view of the block diagram of FIG. 11 showing a portion of the optical engine 202. In the illustrated example, the optical engine 202 employs alignment components 1102, implemented as submounts, to mount each laser light source 418 at a different height from the substrate 402 of the optical engine. In some embodiments, a laser light source 418-1 emitting red laser light 218-1 is coupled to submount 1102-1 having a height $h_1$, a laser light source 418-2 emitting green laser light 218-2 is coupled to submount 1102-2 having a height $h_2$, and a laser light source 418-3 emitting blue laser light 218-3 is coupled to submount 1102-3 having height $h_3$, where $h_1 > h_2 > h_3$. In this way, a vertex of each laser light beam is aligned on a tangent, as illustrated in FIG. 13. For purposes of illustration, in FIG. 13, a vertex at the major axis of each of the red laser light beam 218-1, the green laser beam 218-2, and the blue laser beam 218-3 are aligned along the tangent 1302.

Figure 14:
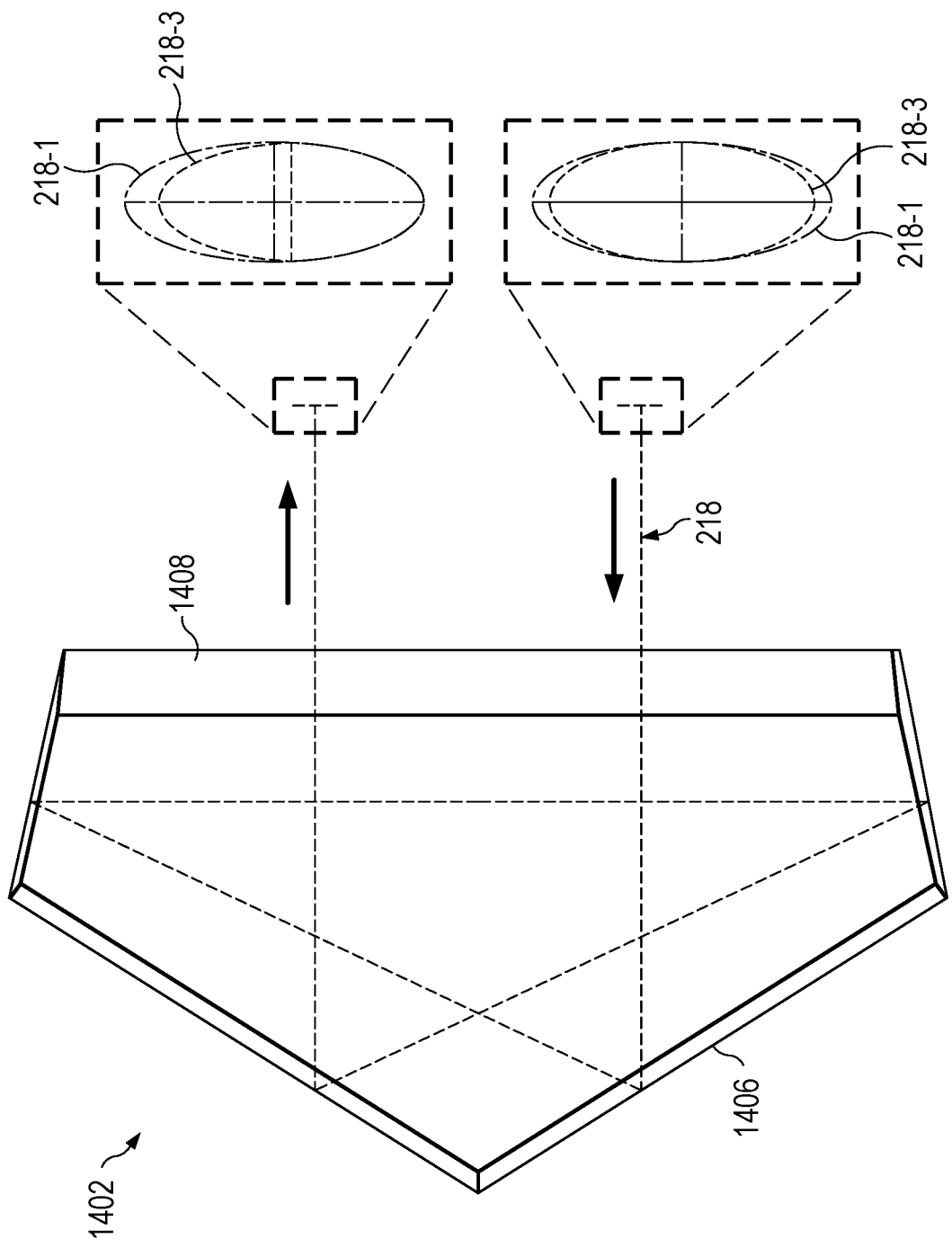
FIG. 14 shows a perspective side view of an alignment component of a laser projection system, such as the laser projection system of FIG. 2, implemented as a prism.

FIG. 14 illustrates a perspective side view of an alignment component 1402 implemented as a prism 1406. In an embodiment, the prism 1406 is positioned within the laser light projector system 200 in the light path between the beam combiner 404 and the mirror 408 of FIG. 4. The prism 1406 functions to alter the paths of the laser light beams entering the prism based on the angular difference in refraction of the laser light beams in the particular material from which the prism is formed. In this way, the laser light beams that exit the prism are biased away from being concentric so as to align on a tangent, such as tangent 1302 of FIG. 13. For example, in a prism formed from N-BK7 glass, blue laser light 218-3 has a refractive index of approximately n=1.5253, while red laser light 218-1 has a refractive index of approximately 1.5149. Thus, the blue laser light 218-3 will refract to a greater degree in a prism made of N-BK7 glass as compared to the red laser light 218-1. By angling the input face 1408 of the prism 1406, the laser light beams that are shifted based on their refractive index are aligned so as to be parallel, but not collinear, when exiting the prism 1406.

For purposes of illustration, with reference to FIG. 14, a blue laser light beam 218-3 having an elliptical shape measuring 0.90 mm along the major axis and a red laser light beam 218-1 having a similar elliptical shape measuring 1.0 mm along the major axis are input into prism 1406. Based on the entry angle into the prism 1406, combined with the refractive index of N-BK7 and a suitable optical path length, on output from the prism 1406, the blue laser light beam 218-3 is shifted by 0.05 mm so that the bottom edges of both the blue laser light beam 218-3 and the red laser light beam 218-1 are tangent.

Note that not all of the activities or elements described above in the general description are required, that a portion of a specific activity or device may not be required, and that one or more further activities may be performed, or elements included, in addition to those described. Still further, the order in which activities are listed is not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A system comprising:
    a waveguide in a lens of a wearable heads-up display, the waveguide comprising an incoupler, wherein the incoupler is an optical grating structure on or within the waveguide;
    a laser projector comprising a plurality of laser diodes mounted to a substrate, the laser projector being configured to provide a plurality of laser light beams to the incoupler of the waveguide; and
    at least one alignment component configured to align the plurality of laser light beams tangent with an edge of the incoupler.

2. The system of claim 1, wherein at least one of the plurality of laser light beams has a different circumference relative to at least one other of the plurality of laser light beams.

3. The system of claim 2, wherein each of the plurality of laser diodes emits laser light over a unique range of wavelengths relative to other laser diodes of the plurality of laser diodes.

4. The system of claim 3, wherein the at least one alignment component comprises a plurality of submounts each configured to couple one of the plurality of laser diodes to the substrate and at least one of the plurality of submounts has a unique height relative to other submounts of the plurality of submounts.

5. The system of claim 4, wherein a height of each of the plurality of submounts is based on a circumference of a laser light beam emitted by a laser diode coupled thereto.

6. The system of claim 3, wherein the at least one alignment component comprises a prism having an input face with a non-zero angle relative to a trajectory of laser light entering the prism.

7. The system of claim 6, further comprising:
at least one micro-electromechanical system (MEMS) scan mirror; and
wherein the prism is disposed between the plurality of laser diodes and the at least one MEMS scan mirror.

8. The system of claim 6, wherein the prism is formed from a material in which an index of refraction for laser light having a smaller wavelength is greater than an index of refraction for laser light having a larger wavelength.

9. The system of claim 6, wherein the non-zero angle is configured to offset a laser light beam having a smaller wavelength relative to a laser light beam having a larger wavelength.

10. A method comprising:
providing, from a plurality of laser diodes, a plurality of laser light beams to an incoupler of a waveguide in a lens of a wearable heads-up display, wherein the incoupler is an optical grating structure on or within the waveguide; and
aligning the plurality of laser light beams to be tangent with an edge of the incoupler using at least one alignment component.

11. The method of claim 10, wherein at least one of the plurality of laser light beams has a different circumference relative to at least one other of the plurality of laser light beams.

12. The method of claim 11, wherein the at least one alignment component comprises a plurality of submounts each configured to couple one of the plurality of laser diodes to a substrate and at least one of the plurality of submounts has a unique height relative to other submounts of the plurality of submounts.

13. The method of claim 12, wherein a height of each of the plurality of submounts is based on a circumference of a laser light beam emitted by a laser diode coupled thereto.

14. The method of claim 10, wherein the at least one alignment component comprises a prism having an input face with a non-zero angle relative to a trajectory of laser light entering the prism.

15. The method of claim 14, wherein the prism is formed from a material in which an index of refraction for laser light having a smaller wavelength is greater than an index of refraction for laser light having a larger wavelength.

16. The method of claim 14, wherein the non-zero angle is configured to offset a laser light beam having a smaller wavelength relative to a laser light beam having a larger wavelength.

17. A laser light projector system comprising:
a plurality of laser diodes each configured to emit a laser light beam having a circumference different from other laser beams emitted by the plurality of laser diodes, wherein the laser light projector system is configured to provide the emitted laser light beams to an incoupler of a waveguide in a lens of a wearable heads-up display, wherein the incoupler is an optical grating structure on or within the waveguide; and
at least one alignment component configured to align the emitted laser light beams tangent with an edge of the incoupler.

18. The laser light projector system of claim 17, wherein the at least one alignment component comprises a plurality of submounts each configured to couple one of the plurality of laser diodes to a substrate of the laser light projector system and at least one of the plurality of submounts has a height that is different from the height of at least one other of the plurality of submounts.

19. The laser light projector of claim 18, wherein the height of each of the plurality of submounts is based on a circumference of a laser light beam emitted by a laser diode coupled thereto.

20. The laser light projector system of claim 17, wherein the at least one alignment component comprises a prism having an input face with a non-zero angle relative to a trajectory of laser light entering the prism.

* * * * *